April 19, 1949. H. J. GRAHAM 2,467,379
WELDING SYSTEM
Filed Sept. 12, 1945 2 Sheets-Sheet 1
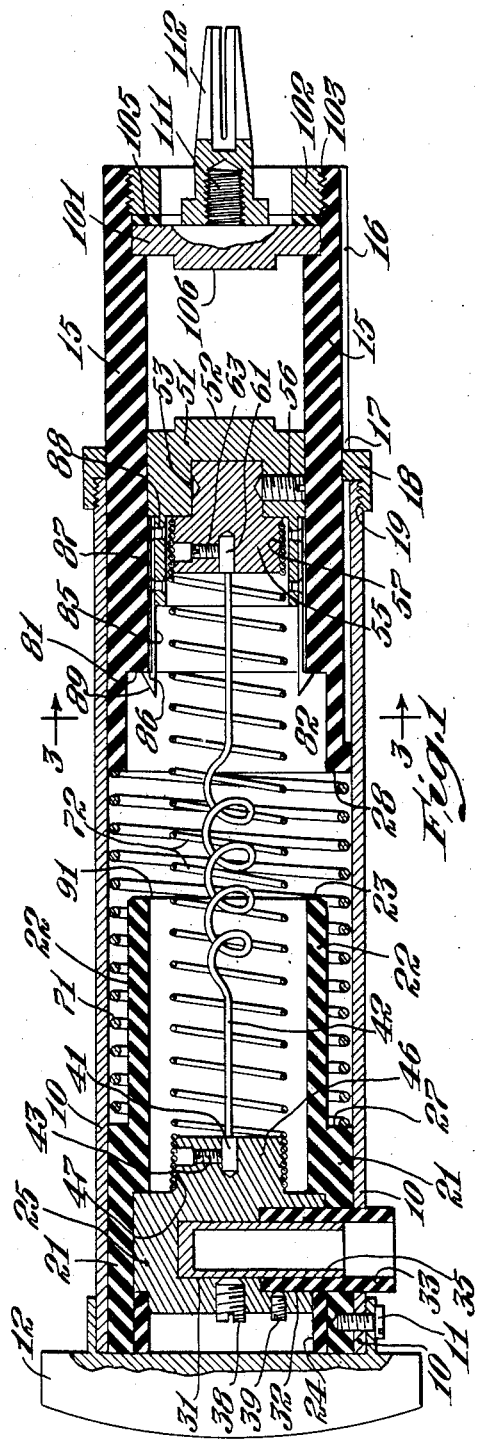
Inventor
Harold J. Graham
by Roberts, Cushman & Grover
att'ys.

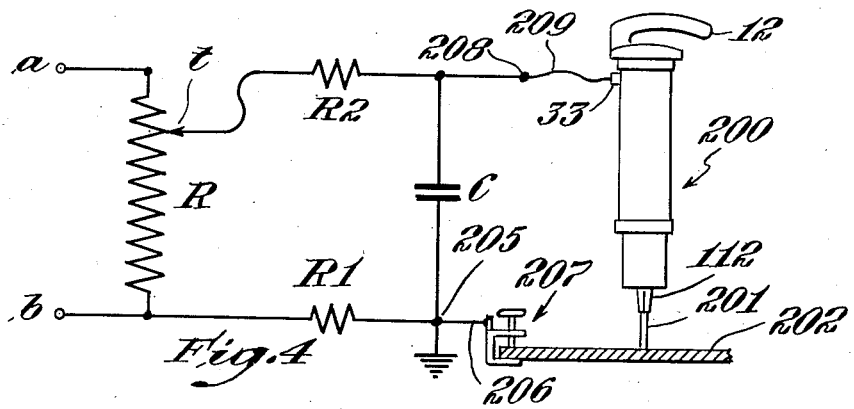
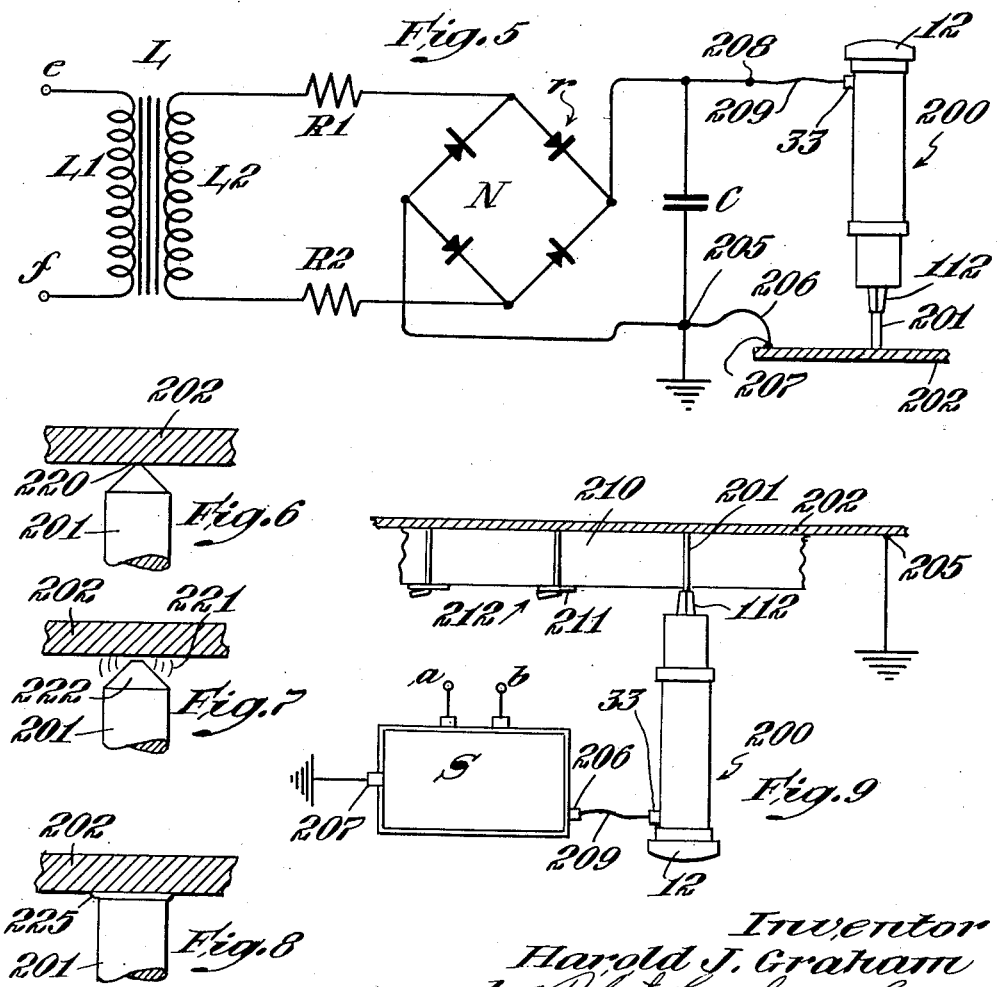

Patented Apr. 19, 1949

2,467,379

UNITED STATES PATENT OFFICE 2,467,379

WELDING SYSTEM

Harold J. Graham, Boston, Mass., assignor, by mesne assignments, to Graham Manufacturing Corporation, Detroit, Mich., a corporation of Michigan Application September 12, 1945, Serial No. 615,758

10 Claims. (Cl. 219—4)

The present invention relates to electric welding systems and more particularly to a welding method and to welding equipment of the type wherein a welding current impulse is applied simultaneously with a mechanical blow tending to unite the construction elements to be joined.

It has heretofore been proposed (for example in United States Patent No. 1,066,468 to Chubb) to apply a percussive blow to two work pieces, for example wires, while directing a welding current through the two pieces. However, these previously proposed systems require rather elaborate current timing, work holding, and blow applying mechanisms for correlating the mechanical and electrical energy impulses; in most instances such provisions are made necessary due to the fact that the work pieces are first brought into contact, whereupon an arc is drawn and thereafter the percussion blow applied. Other systems necessitate various more or less complicated hydraulic, solenoid or compressed air mechanisms which render them unreliable, cumbersome and delicate in operation. Furthermore, such systems can not be used in instances where one of the work pieces is more or less inaccessible, so that one of the work pieces or the point of juncture can not be directly reached.

It is the main object of the present invention to provide an extremely simple, rugged and yet reliable system for the simultaneous application of a mechanical blow and an electric welding impulse to two work pieces to be joined by welding, with welding apparatus proper which is so light that it can be easily operated free-hand in any position without support.

Other objects of the invention are to provide a welding method and welding apparatus of this type which do not require special provisions for holding the two work pieces in contact, which inherently provide for the application of welding current simultaneously with the mechanical blow, which do not necessarily require an external source of mechanical power for dealing the blow, such as solenoid energizing or hydraulic machinery, but which derive mechanical energy from a step of operation which is inherently necessary for performing the welding operation; to provide such apparatus which has a minimum number of very simple parts which can be inexpensively manufactured from readily available material and which does not include switches, timers, release trigger controls, spacers and similar collateral devices; to provide an electric welding hammer which permits welding through obstructing material such as insulating layers covering one of the work pieces to be joined; and to provide apparatus of this type which requires minimum skill for preparing the work preliminary to welding, and for carrying out the welding operation proper.

In one of its aspects, this invention employs very simple percussion apparatus which consists essentially of a guide and guard casing which has an apparatus holding or handle member fastened thereto, of a second or plunger casing which is insulated from and slides on the first mentioned casing and carries a contact and percussion block to which is fastened the chuck or other means for holding the work piece to which the blow is to be applied, and which second casing slidingly engages a working plunger or impact block which is so constructed that it establishes an electric contact simultaneously with striking the above mentioned contact and percussion block; electric current is supplied to this plunger for example by means of a tail wire, and the working force which tends to move the plunger toward the work holding percussion block is supplied by spring or similar means, whose force is released by means of a latching device when the apparatus as a whole, with one work piece inserted in the work holder, is applied to the second work piece, holding it thereagainst preferably by hand through pressing on the above mentioned holder. This pressing together of the work pieces accumulates energy in the spring and, after the necessary energy is stored, releases the latching mechanism and causes the blow to be applied by impact between percussion and work holding blocks, the welding current being applied simply due to the contact between these two elements. In order to reset the device, the working spring is so arranged and if desired assisted by a second spring or similar means, that it retracts the impact element, restoring the apparatus to initial position ready for insertion of a new work piece and for the next weld, without any special resetting operation.

In another aspect, the invention incorporates the above mentioned elements in the form of tubular members which can be manufactured very simply and cheaply, and yet exactly and interchangeably, from easily available stock of insulating and metallic material, and in the form of standard helical springs; these elements can be very easily assembled by sliding them into each other, and similarly disassembled for inspection, cleaning and lubricating.

In still another aspect, the invention permits the joining, by way of welding, of work pieces one of which may be very large and unwieldy, as for example a structural element of a building or ship, and which moreover may be inaccessible due to the presence of a previously applied layer of extraneous material, such as insulation; due to the construction of the welding hammer according to the invention, the welding current can be applied to such a work piece combination without going to more trouble than grounding the inaccessible piece.

These and other objects, aspects and features will appear from the following description of a typical practical embodiment illustrating the novel characteristics of my invention. This description refers to drawings in which Fig. 1 is a longitudinal axial section through a welding hammer according to my invention;

Fig. 2 is a side elevation from the right hand side of Fig. 1;

Fig. 3 is a section on line 3—3 of Fig. 1;

Fig. 4 is a circuit diagram of a direct current supply system for welding apparatus according to the present invention;

Fig. 5 is a circuit diagram similar to Fig. 4, but for use with alternating current;

Figs. 6, 7 and 8 are diagrammatic sections through two work pieces undergoing a welding operation according to my invention; and Fig. 9 is a diagram schematically illustrating the use of a welding hammer according to Figs. 1 to 3, in a system according to Figs. 4 and 5.

Referring to Figs. 1, 2 and 3, the welding hammer according to the invention will first be described.

In these figures, numeral 10 designates an outer guard and guide housing made from metal and carrying holding means, for example screwed thereto at 11 a handle 12 which may take the shape of a grip, or a round face fitting the palm of the hand, or any other shape which might seem convenient or suited for a particular purpose at hand. Such holding means might also be used for fastening the housing to a support or frame if mechanical instead of manual support should be desirable.

Slidingly fitting into the guide casing 10 is a plunger casing 15 made from insulating material and having a groove 16 into which fits the key 17 of a holding ring 18 screwed at 19 to the guide housing 10.

Also secured to the guide housing 10, in the present instance by means of the screw 11 holding handle 12, is a releasing block 21 made similar to casing 15 of insulating material, for instance Bakelite tubing and having a tubular extension 22 with a latch releasing rim 23. Held between the releasing block 21 and a spacer tube 24, likewise of insulating material, is a terminal block 25 made from metal and provided with a bore of two diameters, as indicated at 31 and 32. The outer larger bore 32 contains an insulating tube 33 whose inner diameter is that of the inner bore 31, and tube 33 and bore 31 hold a terminal piece 35 of metal which serves for holding a conductor (not shown in the drawing) by means of a contact screw 38. The insulating tube 33 is held in terminal block 25 by means of another set screw 39. The terminal block 25 also has a central bore 41 adapted for receiving a tail wire 42 held therein by means of a set screw 43. A reduced neck 46 of terminal block 25 is provided with a thread 47, for the purpose to be described hereinbelow.

Within the plunger casing 15 slides a plunger 51 having a somewhat raised impact and contact face 52 and a hollow portion 53. A second terminal block 55 fits into the hollow portion of block 51 wherein it is held by means of set screws 56. The outer larger portion of terminal block 55 is provided with a thread 57, similar to thread 47 of terminal block 25. Block 55 is further provided with a conductor receiving bore 61 and a conductor holding screw 63, similar to the corresponding elements 41 and 43 of terminal block 25.

A resetting spring 71 is inserted between the inside of guide casing 10 and the outside of releasing block portion 22; this spring is substantially untensioned with the hammer in inoperative position as shown in Fig. 1 when it rests between the shoulder 27 of block 21 and the end face 28 of casing 15.

A second working spring 72 is fastened to blocks 25 and 55 by engaging it on threads 47 and 57; as will be described hereinbelow, this spring changes during the operation of the hammer from tensioned to compressed condition of stress.

The terminal block 55 is related to the recess 81 of tube 15 by means of a latch device which consists of a number, for example two spring latches 85 which tend to engage the annular shoulder 81 of tube 15 with their retaining faces 86. As indicated in Figs. 1 and 3, the latch springs 85 are fastened in slots 87 of block 51, for example by means of rivets 88. The inclined faces of the latch springs 85, indicated at 89, are so arranged that during operation of the welding hammer, they are engaged by the inner rim edge of tube 21, indicated in Fig. 1 at 91, so that, upon contact with rim 91, they are pressed inwardly into releasing position.

The plunger casing 15 carries at its outer end a contact and percussion block 101 fastened thereto by means of a retaining ring 102 engaging at 103 a thread of tube 15, and separated from the contact or percussion block 101 by an insulating washer 105 of elastic material. This washer not only insulates block 101 from ring 102, but also serves as a shock absorber. When the entire mass of blocks 51, 55 and 101 hits ring 102 and casing 15, washer 105 gives to a degree sufficient to absorb the shock and prevent movement of the hammer as a whole. The percussion block 101 has a threaded screw extension 111 carrying a work holder 112, which in the present instance consists of a slotted spring tube adapted for receiving and frictionally holding a stud or wire. It will be evident that this simple work piece holder can be replaced by any chuck or similar construction element, depending on the welding job at hand.

Fig. 4 illustrates the use of a welding hammer constructed in the manner described above by way of illustration, with reference to Figs. 1 to 3.

In Fig. 4, numeral 200 denotes a welding hammer of the above described type. It will be noted that one work piece, indicated at 201, is inserted in holder 112 and held by means of handle 12 against the second work piece 202, which may be a structural element, as for example a steel floor, wall or girder.

The hammer and the work pieces are connected in a direct current welding circuit as follows. The circuit receives energy from terminals $a$ and $b$ of a direct current source appropriate for the purposes for example a 220 volt industrial supply network. A voltage regulating resistor R is connected across the supply wires leading on one side through a current limiting resistor R1, to output terminal 205 which is connected to the second work piece 202 for example by means of a flexible conductor 206 and a clamp 207 or similar instrumentality. The other side of resistor R is connected, through an adjustable tap $t$ or other suitable adjusting means, and through a current limiting resistor R2 to a terminal device 208, which, together with terminals $a$, $b$ and 205 and the other circuit elements, may be mounted on a convenient switchboard or power supply unit. Work piece 202 and terminal 205 may be grounded by conventional means, as indicated in Fig. 4. A capacitor C is connected between terminals 205 and 208, for the purpose of storing electric energy supplied by network $a$, $b$, during the period when the welding hammer retains the welding circuit open, that is so long as contact faces 52 and 106 are separated from each other as shown in Fig. 1. A securely insulated flexible conductor 209 leads from terminal 208 to connector elements 35, 42, 55, 51 of the hammer, as indicated in Fig. 1. For a welding tool of the type herein described by way of example, limiting resistors of together approximately 10 ohm and a capacitor of about 18,000 microfarad were found to be satisfactory for welding ⅛″ iron wire to sheet steel material.

If it is desired to operate welding hammers according to the present invention from alternating current networks, an arrangement schematically indicated in Fig. 5 may be used.

In Fig. 5, $e$ and $f$ are terminals provided for connection of a standard alternating current supply line to the primary L1 of a transformer L, whose secondary L2 feeds into a rectifier network N through limiting resistors R1 and R2. This rectifier network may be of the conventional bridge type as indicated in Fig. 5, incorporating four rectifier units $r$. The output terminals of the rectifier network N are connected to terminals 205 and 208, which correspond to those indicated with similar numerals in Fig. 4. Terminal 205 may be grounded and is again connected to the work piece 202, whereas terminal 208 is connected, through flexible conductor 209, to the hammer 200.

The above described welding system according to the invention operates as follows:

A work piece 201, for example a stud of the type to be described hereinbelow with reference to Fig. 6, is inserted in work holder 112, and manually held, by means of handle 12, towards the second work piece 202 at the point where the two pieces are to be joined. Pressure is now applied such as to cause compression of springs 71 and 72, and sliding movement between tubes 10 and 15, with the narrower portion 22 of tubular block 21 entering into the wider portion 82 of the plunger casing 15. When the rim portion 91 of tube 22 reaches the oblique latch faces 89, the latches 86 are pressed inwardly causing detachment thereof and sudden release of the plunger 51 which thereupon impacts with considerable force upon the contact block member 101. At the same time, electric contact is established between faces 52 and 106, welding current being supplied from terminal 208 (Figs. 4 and 5), through flexible conductor 209, connector 35, block 25, tail wire 42, connector 61, and connector block 55; the circuit is completed through work holder 112, work pieces 201 and 202, and the connection from connector 207 to terminal 205, which may be accomplished by means of conductor 206, or by way of ground.

The two work pieces 201 and 202 are firmly united by the simultaneous application of the welding current and the percussion blow. When pressure is released from handle 12, block 51 is retracted by spring 72 which became compressed shortly before the impact, until latches 86 again engage the retaining face 81 of tube 15. The spring 71 which was compressed together with spring 72 assists in this retracting operation. With the latches engaged and spring 72 relaxed, the hammer is again in normal condition, ready for withdrawal from the work piece 201, and for insertion of a new work piece and repetition of the above described cycle of operation.

It should be noted that separation of the work pieces for initiating the welding operation is unnecessary and not contemplated; current flow prior to the contact of faces 52 and 106 is impossible, and it ceases with the separation of these contact members. To the best of my present knowledge, welding with apparatus of the above described type proceeds as follows.

The contact of work pieces 201 and 202 does not extend over the entire area common to both work pieces, especially since the end of the loose piece is more or less ragged and usually has a chisel point due to the tool with which it was severed, such as shears or cutters. In order to emphasize this condition, I sometimes prefer to use a pointed stud. During the initial stage of the welding act, the work pieces are in the condition schematically indicated in Fig. 6, and at that moment the current flows through a comparatively small cross section at the tip 220 of the stud, which will therefore become heated and melt off rapidly, leading for a very short time (in the order of a millisecond) to the condition indicated in Fig. 7. At that instant, the mechanical contact between the two work pieces is effectively interrupted and the common region ionized so that an arc 222 forms as indicated in Fig. 7, promoting the welding operation by fusing the adjacent portions of both work pieces. In the next instant, the two work pieces are forced even closer together and into each other by the blow, joining over a comparatively extensive area indicated in Fig. 8, where 225 designates the region permanently joined mainly by fusing due to the arc effect indicated in Fig. 7. It will be evident that these stages will not be strictly separated but take place more or less jointly and inseparably; at any rate the two work pieces remain pressurably joined during the entire operation so far as the effect of the hammer is concerned, and the arc formation is due to the melting of the contact area of low effective cross section and hence high resistance rather than to a mechanical separation of the work pieces after a closed current path has been established therethrough.

The particular usefulness of a welding device according to the invention will be apparent with reference to Fig. 9, where 202 is again a metallic structural element, in this instance for example a ceiling or wall which is covered by insulating material 210 temporarily attached thereto, and required permanently to affix by metal studs. In order to accomplish this operation, studs 201, held in chuck 112 of the welding hammer 200 according to the invention, are inserted through the insulation layer 210, approximately perpendicular to wall 202, until they touch it, whereupon upon continued pressure against handle 12, the above described welding takes place, affixing the stud 201 firmly to wall 202. The hammer is withdrawn and the operation repeated. Washers, disks, straps, or similar structural elements indicated at 211, may thereupon be threaded over studs 201, and the latter bent over as indicated at 212 of Fig. 9, thus firmly and permanently fastening the insulation to the metallic wall.

Fig. 9 also indicates how the power supply unit, indicated at S and incorporating the circuit elements shown in Figs. 4 and 5, may best be applied to work of this type.

It should be understood that the present disclosure is for the purpose of illustration only and that this invention includes all modifications and equivalents which fall within the scope of the appended claims.

I claim:

1. Electric welding apparatus comprising a guide casing having apparatus holding means fastened thereto; a plunger casing sliding on and insulated from said guide casing, having fixed thereto a percussion block carrying a work holder, and slidingly engaging a working plunger adapted to impinge upon and to make electrical contact with said block; means for supplying electric current to said plunger; a source of working force tending to move said plunger towards said block when said guide casing is moved towards said plunger casing; and latching means normally engaging said plunger attaching it to said plunger casing against the action of said force and extending into the path of a portion of said guide casing for release by said portion upon relative displacement of said casings against said working force.

2. Electric welding apparatus comprising a guide casing having apparatus holding means and latch release means fastened to one side thereof; a plunger casing sliding on the other side of and being insulated from said guide casing, having fixed thereto near its outer end and extending therefrom, free from said guide casing, a percussion block carrying a work holder, and slidingly engaging a working plunger adapted to impinge upon and to make electrical contact with said block; means for supplying electric current to said plunger; spring means confined within said casings and tending to move said plunger towards said block when said holding means and said guide casing are moved towards said block against the force of said spring; and latching means normally engaging said plunger attaching it to said plunger casing for disengagement by said latch release means upon relative displacement of said casings against the force of said spring.

3. Electric welding apparatus comprising a guide casing having fastened thereto apparatus holding means and a conductive connector insulated therefrom; a plunger casing sliding on and insulated from said guide casing and having fixed thereto a percussion block carrying a work holder; a working plunger slidingly engaged by said plunger casing and adapted to impinge upon and to make electrical contact with said block; a source of working force tending to move said plunger towards said block when said holding means and said guide casing are moved towards said block; latching means normally engaging said plunger attaching it to said plunger casing against the action of said force and extending into the path of a portion of said guide casing for release by said portion upon relative displacement of said casings against said working force; means for supplying electric current from said connector to said plunger; and a source of resetting force tending to separate said casings and to move said plunger into engagement by said latching means.

4. Electric welding apparatus comprising a guide casing having fastened thereto apparatus holding means and a conductive connector insulated therefrom; a plunger casing sliding on and insulated from said guide casing and having fixed thereto a percussion block carrying a work holder; a working plunger slidingly engaging said plunger casing and adapted to impinge upon and to make electrical contact with said block; a working spring fastened between said guide casing and said plunger and tending to move said plunger towards said block when said guide casing is moved towards the plunger; latching means normally engaging said plunger attaching it to said plunger casing against the action of said working spring but releasing the plunger upon contact with a portion of said guide casing upon continued relative displacement of said casings against said working spring action; means for supplying electric current from said connector to said plunger; and a resetting spring inserted between said casings and tending to separate said casings and to move said plunger into engagement by said latching means.

5. Electric welding apparatus comprising a tubular guide casing having handle means and an insulated conductive connector fastened to one side thereof and forming on the other side a latch releasing rim; a tubular plunger casing sliding on and insulated from said guide casing and having fixed thereto at the end removed from said handle means and extending therefrom, free from said guide casing, a percussion block carrying a work holder; a working plunger slidingly engaging said plunger casing and adapted to impinge upon and to make electrical contact with said block; a normally substantially relaxed working spring fastened between said guide casing and said plunger and tending to move said plunger towards said block when said guide casing is moved towards the plunger; latching means fastened to said plunger for normally engaging said plunger casing against the force of said spring but releasing the plunger upon contact with said rim upon continued relative displacement of said casings against said spring force; means for supplying electric current from said connector to said plunger; and a resetting spring inserted between said casings within said guide casing and tending to separate said casings and to move said plunger into engagement by said latching means.

6. Electric welding apparatus comprising a guide casing having apparatus holding means fastened thereto; a plunger casing sliding on and insulated from said guide casing, having fixed thereto a percussion block carrying a work holder, and slidingly engaging a working plunger adapted to impinge upon said block; a source of working force tending to move said plunger towards said block when said guide casing is moved towards said plunger casing; and latching means normally engaging said plunger attaching it to said plunger casing against the action of said force but releasing the plunger upon contact with a portion of said guide casing upon continued relative displacement of said casings against said working force.

7. Electric welding apparatus comprising a tubular guide casing having handle means fastened to one side thereof and forming on the other side a latch releasing rim; a tubular plunger casing sliding on said guide casing and having fixed thereto at the end removed from said handle means and extending therefrom, free from said guide casing, a percussion block carrying a work holder; a working plunger slidingly engaging said plunger casing and adapted to impinge upon said block; a normally substantially relaxed working spring fastened between said guide casing and said plunger and tending to move said plunger towards said block when said guide casing is moved towards the plunger; latching means fastened to said plunger for normally engaging said plunger casing against the force of said spring but releasing the plunger upon contact with said rim upon continued relative displacement of said casings against said spring force; and a resetting spring inserted between said casings within said guide casing and tending to separate said casings and to move said plunger into engagement by said latching means.

8. A welding system comprising a hammer unit having means for engaging a loose work piece, means for holding said work piece to a second substantially stationary work piece for welding it thereto, a percussion block, conductor means for supplying electric current to said block, an energy source adapted momentarily to urge said block suddenly with a blow against said holding means for establishing forcible mechanical contact between said block and said holding means, and means for establishing electrical contact between said conductor means and said holding means substantially simultaneously with said mechanical contact; and a current source connected between said conductor means and said second work piece; said source sending a welding current through said work pieces simultaneously with said mechanical contact upon actuation of said energy source, establishing a welding current path through said block and said engaging means.

9. A welding system comprising a hammer unit having means for engaging a loose work piece, means for holding said work piece to a second substantially stationary work piece for welding it thereto, a percussion block, conductor means for supplying electric current to said block, means adapted momentarily to force said block against said holding means for establishing a mechanical impact between said block and said holding means, and means for establishing electrical contact between said conductor means and said holding means substantially simultaneously with said mechanical impact; a direct current source connected between said conductor means and said second work piece; and a capacitor connected across said source; said capacitor discharging welding energy to said work piece substantially simultaneously with said mechanical impact upon actuation of said block forcing means.

10. A welding system for joining a loose work piece having a substantially uneven end surface to a substantially-secured work piece, comprising a hammer unit having means for firmly engaging said loose work piece for pressing it against said second work piece, a percussion block, conductor means for supplying electric current to said block, a normally restrained energy source urging said block towards said holding means, means for releasing the energy of said source suddenly to apply a blow against said holding means for establishing forcible mechanical contact between said block and said holding means, and means for establishing electrical contact between said conductor means and said work piece engaging means substantially simultaneously with said mechanical contact; and a current source connected to said conductor means; said source delivering welding energy to said work pieces simultaneously with said mechanical contact upon actuation of said energy source and said contact establishing a welding path through the easily melting region of said uneven end surface and the arc forming upon melting of the contacting surfaces.

HAROLD J. GRAHAM.

REFERENCES CITED

The following references are of record in the file of this patent:

UNITED STATES PATENTS

| Number | Name | Date |
| --- | --- | --- |
| 1,066,468 | Chubb | July 8, 1913 |
| 1,269,726 | Mershon | June 18, 1918 |
| 2,272,968 | Dyer | Feb. 10, 1942 |
| 2,383,695 | Thacker | Aug. 28, 1945 |